(12) United States Patent
Emley

(10) Patent No.: US 8,991,251 B1
(45) Date of Patent: Mar. 31, 2015

(54) HYBRID CAPACITIVE AND PIEZOELECTRIC MOTION SENSING TRANSDUCER

(75) Inventor: Nathan C. Emley, San Francisco, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 298 days.

(21) Appl. No.: 13/301,581

(22) Filed: Nov. 21, 2011

(51) Int. Cl.
G01P 15/18 (2013.01)
G01P 15/09 (2006.01)
G01P 15/125 (2006.01)

(52) U.S. Cl.
CPC ................................. G01P 15/09 (2013.01)
USPC .................. 73/510; 73/514.32; 73/514.34

(58) Field of Classification Search
USPC ............ 73/510, 511, 514.34, 514.32, 514.38, 73/514.01
See application file for complete search history.

(56) References Cited

U.S. PATENT DOCUMENTS

| | | | |
|---|---|---|---|
| 5,914,507 A | 6/1999 | Polla et al. | |
| 5,959,209 A * | 9/1999 | Takeuchi et al. | 73/514.34 |
| 6,227,049 B1 | 5/2001 | Fujii | |
| 6,257,062 B1 * | 7/2001 | Rich | 73/514.32 |
| 6,263,734 B1 * | 7/2001 | Fujii et al. | 73/514.34 |
| 6,463,804 B2 * | 10/2002 | Matsumoto et al. | 73/514.32 |
| 6,938,484 B2 * | 9/2005 | Najafi et al. | 73/514.32 |
| 6,955,086 B2 * | 10/2005 | Yoshikawa et al. | 73/514.32 |
| 7,559,242 B2 * | 7/2009 | Wang et al. | 73/651 |
| 7,690,255 B2 * | 4/2010 | Gogoi et al. | 73/514.32 |
| 7,716,983 B2 | 5/2010 | Lehtonen | |
| RE42,083 E | 2/2011 | Fujii | |
| 7,934,423 B2 * | 5/2011 | Nasiri et al. | 73/514.02 |
| 7,954,377 B2 * | 6/2011 | Higuchi et al. | 73/514.34 |
| 8,020,443 B2 * | 9/2011 | Lin et al. | 73/514.32 |
| 8,333,113 B2 * | 12/2012 | Classen et al. | 73/514.32 |
| 2004/0182156 A1 * | 9/2004 | Goto | 73/514.32 |
| 2006/0185432 A1 * | 8/2006 | Weinberg | 73/510 |
| 2007/0125151 A1 * | 6/2007 | Taguchi et al. | 73/11.04 |
| 2008/0030205 A1 * | 2/2008 | Fujii et al. | 324/661 |
| 2010/0208575 A1 * | 8/2010 | Tanner | 369/263.1 |

OTHER PUBLICATIONS

J. Dargahi et al., "Design and microfabrication of a hybrid piezoelectric-capacitive tactile sensor", Sensor Review, vol. 26, No. 3, pp. 186-192 (2006).

* cited by examiner

Primary Examiner — Helen Kwok

(57) ABSTRACT

A motion sensing transducer includes an electrically conductive substrate having a major surface that defines a substrate plane, and a first compliant structure including a piezoelectric material and having greater compliance to inertial forces oriented out of the substrate plane than to inertial forces oriented in the substrate plane. The first compliant structure includes a piezoelectric material. The motion sensing transducer includes a second compliant structure having greater compliance to inertial forces oriented in the substrate plane than to inertial forces oriented out of the substrate plane. The second compliant structure includes a first surface that is electrically isolated from the substrate. The first surface faces a surface of the substrate. The motion sensing transducer includes a first electrically conductive lead that is electrically connected to the first surface, and a second electrically conductive lead that is electrically connected to the piezoelectric material.

16 Claims, 9 Drawing Sheets

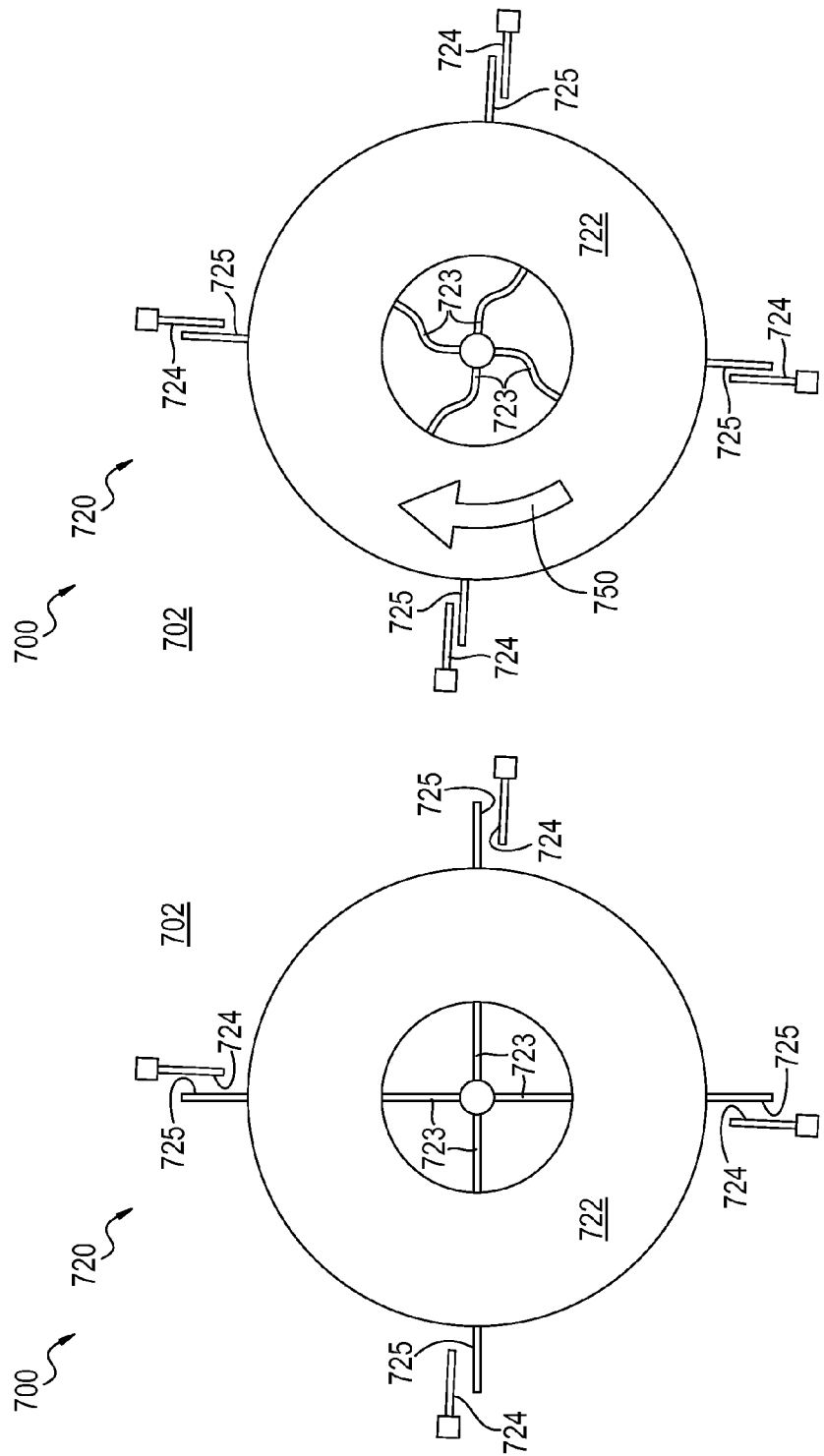

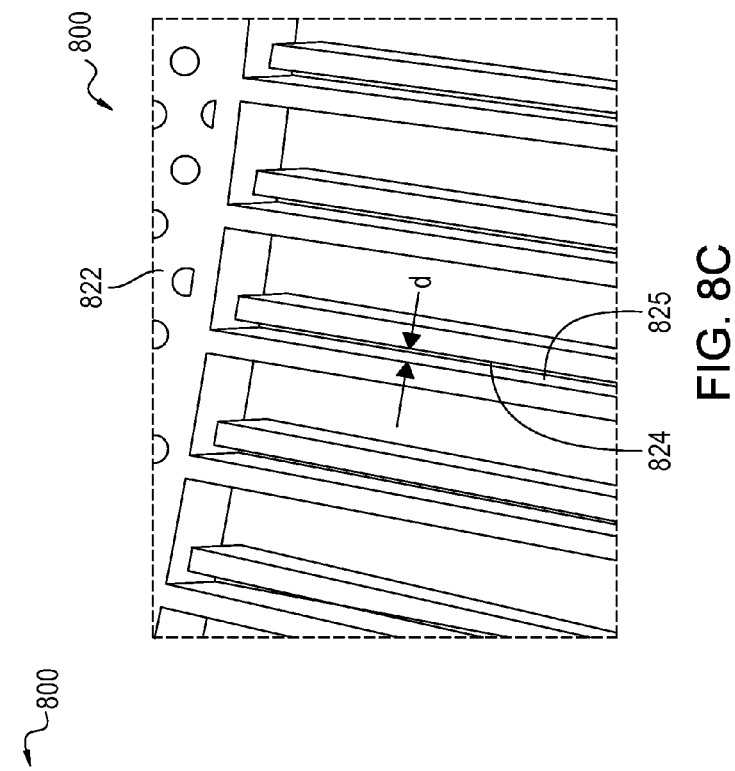
FIG. 8C
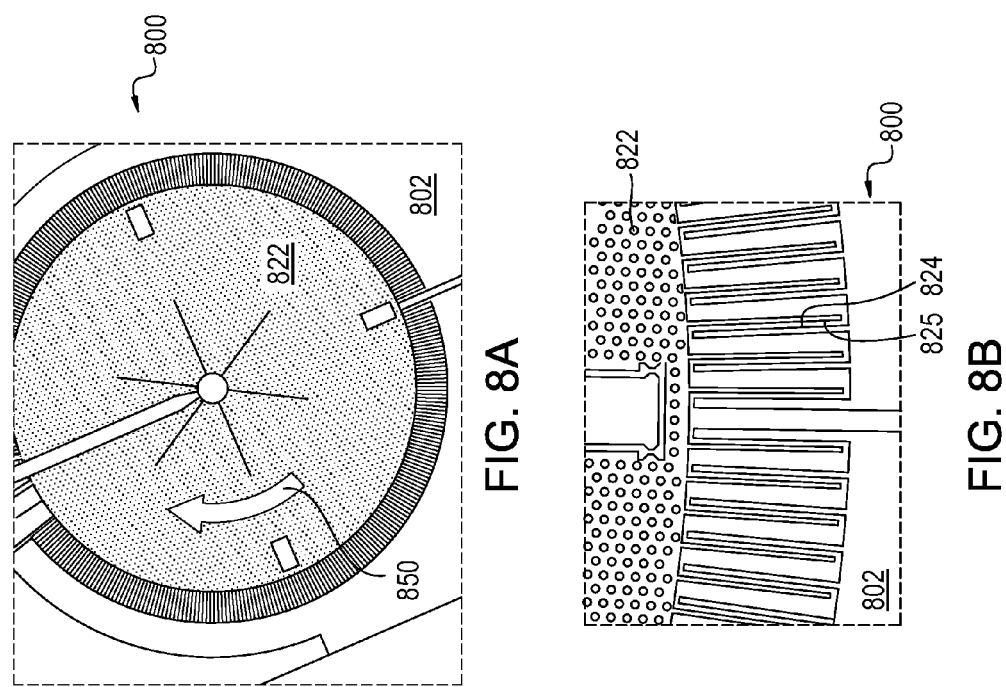
FIG. 8A
FIG. 8B

HYBRID CAPACITIVE AND PIEZOELECTRIC MOTION SENSING TRANSDUCER

BACKGROUND

Information storage devices are used to retrieve and/or store data in computers and other consumer electronics devices. A magnetic hard disk drive is an example of an information storage device that is mass-manufactured. A magnetic hard disk drive is also an example of a device having internal components requiring precise position and/or motion control in the possible presence of mechanical shocks or vibrations from external or internal sources. Such control may be accomplished by passive or active means. Sensing device acceleration (translational and/or rotational), possibly along or about more than one axis, may facilitate active position and/or motion control of device components. Hence, there is a need in the art for improved small motion sensing transducers that can sense acceleration along or about more than one axis. There is also a need in the art for improved small motion sensing transducers that can be practically and economically mass-manufactured.

BRIEF DESCRIPTION OF DRAWINGS

FIG. 7A depicts an example capacitive in-plane rotation sensing transducer.

FIG. 7B depicts the capacitive in-plane rotation sensing transducer of FIG. 7A, in a deflected state.

FIG. 8A is a top view of an example capacitive in-plane rotation sensing transducer.

FIG. 8B is a top view of a portion of the capacitive in-plane rotation sensing transducer of FIG. 8A.

FIG. 8C is a top perspective view of a portion of the capacitive in-plane rotation sensing transducer of FIGS. 8A and 8B.

DETAILED DESCRIPTION OF EXAMPLE EMBODIMENTS

Figure 1:
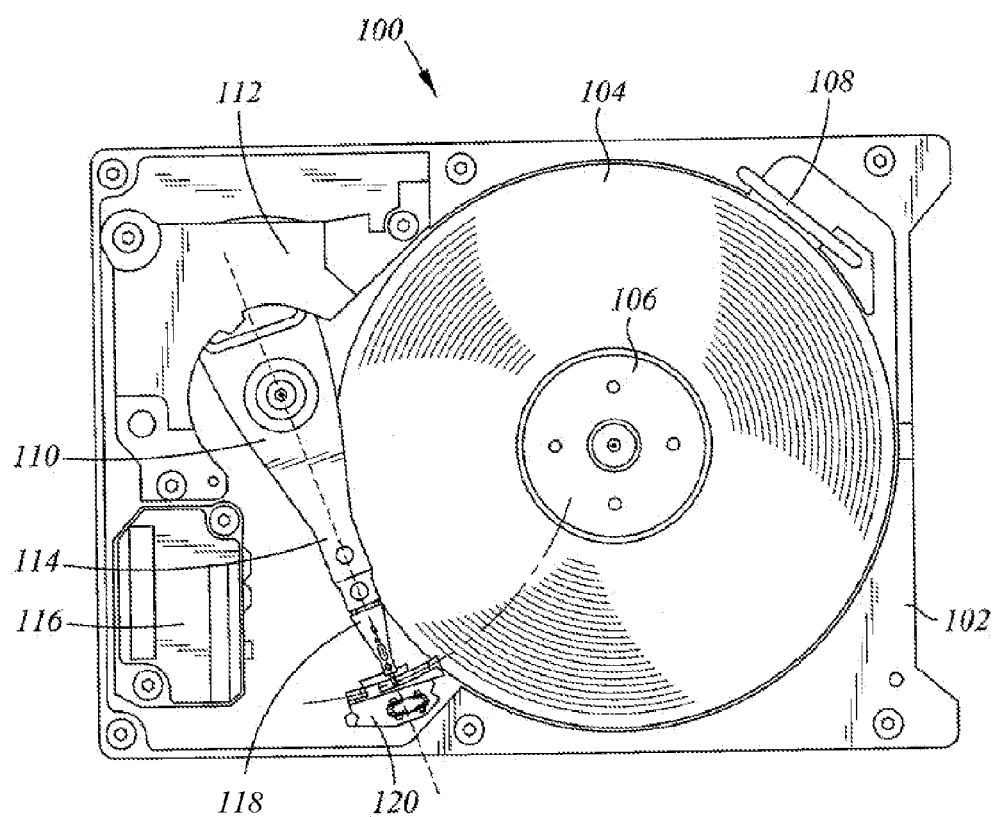
FIG. 1 is a top view of a disk drive 100 capable of including an embodiment of the present invention.

FIG. 1 is a top view of a disk drive 100 capable of including an embodiment of the present invention. The disk drive 100 includes a disk drive base 102 and at least one annular magnetic disk 104. The disk drive 100 further includes a spindle 106, rotably mounted on the disk drive base 102, for rotating the disk(s) 104. The rotation of the disk(s) 104 establishes air flow through recirculation filter 108.

The disk drive 100 further includes an actuator 110 that is rotably mounted on disk drive base 102. The actuator 110 includes at least one actuator arm 114, upon which at least one head gimbal assembly (HGA) 118 is attached. Voice coil motor 112 rotates the actuator 110 through a limited angular range so that the HGA(s) 118 may be desirably positioned relative to one or more tracks of information on a corresponding one of the disks 104. Each HGA 118 includes a head (not visible in the view of FIG. 1) for reading and writing data from and to one of the disks 104. When the disk drive 100 is not in use, the voice coil 112 may rotate the actuator 110 to retract the HGA(s) 118 from the surface(s) of the disk(s) 104, onto a ramp 120. Electrical signals to/from the HGAs 118 may be carried to other drive electronics via flex cable (not shown) that leads to a flex cable bracket 116.

Figure 2:
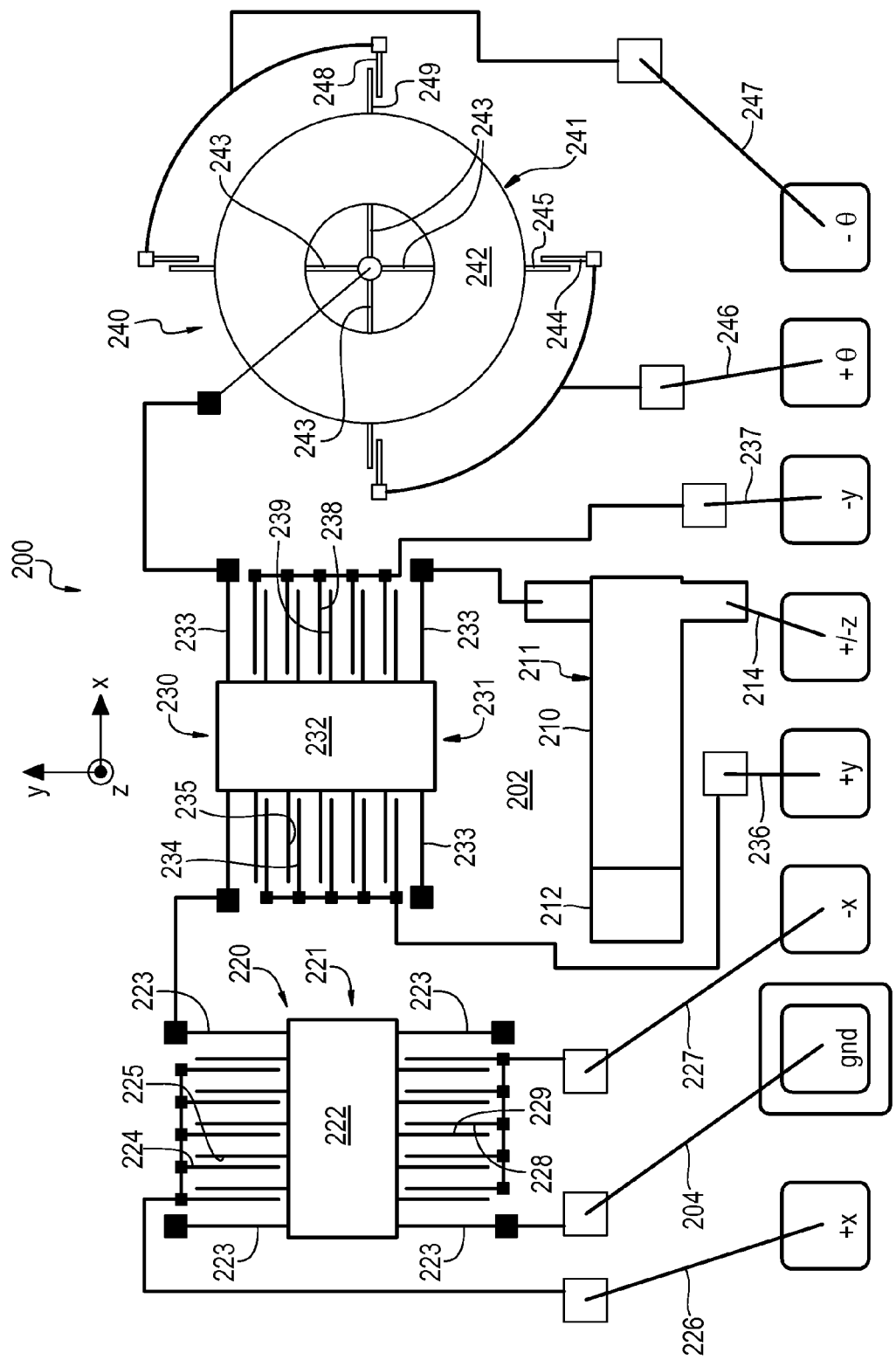
FIG. 2 depicts a hybrid capacitive and piezoelectric motion sensing transducer, according to an embodiment of the present invention.

FIG. 2 depicts a hybrid capacitive and piezoelectric motion sensing transducer 200, according to an embodiment of the present invention. The motion sensing transducer 200 includes an electrically conductive substrate 202 having a major surface that defines a substrate plane that is parallel to the plane of the FIG. 2 drawing sheet, and that is marked as the X-Y plane in FIG. 2. For example, the electrically conductive substrate 202 may be fabricated from a wafer of silicon doped with a dopant that increases the electrical conductivity of the silicon. Also for example, the electrically conductive substrate 202 may be fabricated from a silicon or $SiO_2$ wafer that includes an electrically conductive coating.

In the embodiment of FIG. 2, the motion sensing transducer 200 includes a first compliant structure 210 having greater compliance to inertial forces oriented out of the substrate plane (e.g. in the Z direction normal to the FIG. 2 drawing sheet) than to inertial forces oriented in the substrate plane (e.g. in the X-Y plane that is parallel to the FIG. 2 drawing sheet). In the embodiment of FIG. 2, the first compliant structure 210 may be a cantilevered beam fabricated from a laminate structure that includes a layer comprising piezoelectric material (e.g. AlN). In certain embodiments, the first compliant structure 210 may preferably include a proof mass 212 at the distal end of the cantilever beam structure, which may enhance the strain of the first compliant structure in response to inertial forces.

The piezoelectric material in the first compliant structure 210 may comprise AlN, ZnO, $PbZrTiO_3$, or the like. In certain embodiments, the piezoelectric material in the first compliant structure 210 may preferably be CMOS-compatible piezoelectric material, such as AlN. Being CMOS-compatible implies compliance with a silicon processing standard of cleanliness (e.g. industry standards applicable to transistor fabrication). Fabrication for other piezoelectric materials may not be CMOS-compatible, so that certain industry standard tools and processing techniques may not be available for such materials.

In the embodiment of FIG. 2, the motion sensing transducer 200 includes a second compliant structure 220. The second compliant structure 220 does not have to be compliant throughout, but rather a substantial portion of it may move as a rigid body, for example with some compliant structure(s) between such rigid portion and the substrate 202. For example, the second compliant structure 220 may include a proof mass 222 attached to the substrate 202 by compliant springs 223, configured to allow greater compliance to inertial forces acting on the proof mass 222 that are oriented in the substrate plane (e.g. parallel to the X direction that is marked in FIG. 2) than to inertial forces acting on the proof mass 222 that are oriented out of the substrate plane (e.g. in the Z direction that is normal to the FIG. 2 drawing sheet).

In the embodiment of FIG. 2, the second compliant structure 220 includes a plurality of first surfaces 224, 228 that are electrically isolated from the substrate 202, and a plurality of second surfaces 225, 229 that are electrically connected to the substrate 202 or are a part of the substrate. The first surfaces 224, 228 face respective ones of the second surfaces 225, 229, so that electrical capacitance between the first surfaces 224, 228 and the second surfaces 225, 229 varies inversely with the distance (in the X direction) between the first surfaces 224, 228 and the second surfaces 225, 229.

Such variations in capacitance may be sensed via electrically conductive leads. For example, a pair of first electrically conductive leads 226, 227 may be electrically connected to the first surfaces 224, 228, respectively. The capacitance between the first electrically conductive lead 226 and the substrate 202 (e.g. ground 204) varies with translation of the proof mass 222 in the X direction. An opposing variation in capacitance is expected between the first electrically conductive lead 227 and the substrate 202 (e.g. ground 204), since the spacing in the X direction between the first surfaces 228 and the second surfaces 229 varies oppositely, compared with the spacing in the X direction between the first surfaces 224 and the second surfaces 225.

In this way, the substrate 202, the second compliant structure 220, and the first electrically conductive lead 226, may together be comprised by a first capacitive accelerometer 221 that is more sensitive to accelerations in the X direction in the substrate plane X-Y, than to accelerations in the Y direction in the substrate plane X-Y, or accelerations out of the substrate plane (e.g. in the Z direction). Optional use of both of the first electrically conductive leads 226, 227 may advantageously facilitate differential operation of the first capacitive accelerometer 221.

In the embodiment of FIG. 2, a second electrically conductive lead 214 may be electrically connected to the piezoelectric material of the first compliant structure 210, so that the piezoelectric material of the first compliant structure 210 and the second electrically conductive lead 214, are together comprised by a first piezoelectric accelerometer 211 that is more sensitive to accelerations out of the substrate plane (e.g. in the Z direction), than to accelerations in the substrate plane X-Y.

In the embodiment of FIG. 2, hybrid capacitive and piezoelectric motion sensing transducer 200 optionally comprises a second capacitive accelerometer 231 that is more sensitive to accelerations in the Y direction in the substrate plane X-Y, than to accelerations in the X direction in the substrate plane X-Y, or to accelerations out of the substrate plane (e.g. in the Z-direction). Hence, the second capacitive accelerometer 231 is more sensitive to accelerations parallel to the first surface 224 of the first capacitive accelerometer 221, than to accelerations normal to the first surface 224 of the first capacitive accelerometer 221.

In the embodiment of FIG. 2, the second capacitive accelerometer 231 may include a third compliant structure 230. The third compliant structure 230 may include a proof mass 232 attached to the substrate 202 by compliant springs 233, configured to allow greater compliance to inertial forces acting on the proof mass 232 that are oriented in the substrate plane (e.g. parallel to the Y direction that is marked in FIG. 2) than to inertial forces acting on the proof mass 232 that are oriented out of the substrate plane (e.g. in the Z direction that is normal to the FIG. 2 drawing sheet).

In the embodiment of FIG. 2, the third compliant structure 230 includes a plurality of third surfaces 234, 238 that are electrically isolated from the substrate 202, and a plurality of fourth surfaces 235, 239 that are electrically connected to the substrate 202 or are a part of the substrate. The third surfaces 234, 238 face respective ones of the fourth surfaces 235, 239, so that electrical capacitance between the third surfaces 234, 238 and the fourth surfaces 235, 239 varies inversely with the distance (in the Y direction) between the third surfaces 234, 238 and the fourth surfaces 235, 239.

Such variations in capacitance may be sensed via electrically conductive leads. For example, a pair of third electrically conductive leads 236, 237 may be electrically connected to the third surfaces 234, 238, respectively. The capacitance between the third electrically conductive lead 236 and the substrate 202 (e.g. ground 204) varies with translation of the proof mass 232 in the Y direction. An opposing variation in capacitance is expected between the third electrically conductive lead 237 and the substrate 202 (e.g. ground 204), since the spacing in the Y direction between the third surfaces 238 and the fourth surfaces 239 varies oppositely, compared with the spacing in the Y direction between the third surfaces 234 and the fourth surfaces 235.

In this way, the substrate 202, the third compliant structure 230, and the third electrically conductive lead 236, may together be comprised by the second capacitive accelerometer 231 that is more sensitive to accelerations in the Y direction in the substrate plane X-Y, than to accelerations in the X direction in the substrate plane X-Y, or accelerations out of the substrate plane (e.g. in the Z direction). Optional use of both of the third electrically conductive leads 236, 237 may advantageously facilitate differential operation of the second capacitive accelerometer 231.

In the embodiment of FIG. 2, hybrid capacitive and piezoelectric motion sensing transducer 200 optionally comprises a capacitive rotational accelerometer 241 that is more sensitive to rotational accelerations in the plane X-Y of the substrate 202 (e.g. about the Z axis) than to translational accelerations in the plane X-Y of the substrate 202 or translational accelerations out of the plane of the substrate 202 (e.g. along the Z-axis).

In the embodiment of FIG. 2, the capacitive rotational accelerometer 241 may include a rotationally compliant structure 240. The rotationally compliant structure 240 may include a proof mass 242 attached to the substrate 202 by compliant springs 243, configured to allow greater compliance to inertial torques acting on the proof mass 242 that are oriented in the X-Y substrate plane (e.g. about the Z axis direction that is marked in FIG. 2) than to inertial forces that attempt to translate the proof mass 242.

In the embodiment of FIG. 2, the rotationally compliant structure 240 includes a plurality of fifth surfaces 244, 248 that are electrically isolated from the substrate 202, and a plurality of sixth surfaces 245, 249 that are electrically connected to the substrate 202 or are a part of the substrate. The fifth surfaces 244, 248 face respective ones of the sixth surfaces 245, 249, so that electrical capacitance between the fifth surfaces 244, 248 and the sixth surfaces 245, 249 varies inversely with the distance between the fifth surfaces 244, 248 and the sixth surfaces 245, 249.

Such variations in capacitance may be sensed via electrically conductive leads. For example, a pair of fifth electrically conductive leads 246, 247 may be electrically connected to the fifth surfaces 244, 248, respectively. The capacitance between the fifth electrically conductive lead 246 and the substrate 202 (e.g. ground 204) varies with rotation of the proof mass 242 about the Z axis (i.e. changes in angular position θ about the Z-axis). An opposing variation in capacitance is expected between the fifth electrically conductive lead 247 and the substrate 202 (e.g. ground 204), since the spacing between the fifth surfaces 248 and the sixth surfaces 249 varies oppositely with a given sense of rotation of the proof mass 242, compared with the spacing between the fifth surfaces 244 and the sixth surfaces 245.

In this way, the substrate 202, the rotationally compliant structure 240, and the fifth electrically conductive lead 246, may together be comprised by the capacitive rotational accelerometer 241 that is more sensitive to rotational accelerations about the Z axis (in the substrate plane X-Y), than to translational accelerations. Optional use of both of the fifth electrically conductive leads 246, 247 may advantageously facilitate differential operation of the capacitive rotational accelerometer 241.

Figures 3A, 3B:
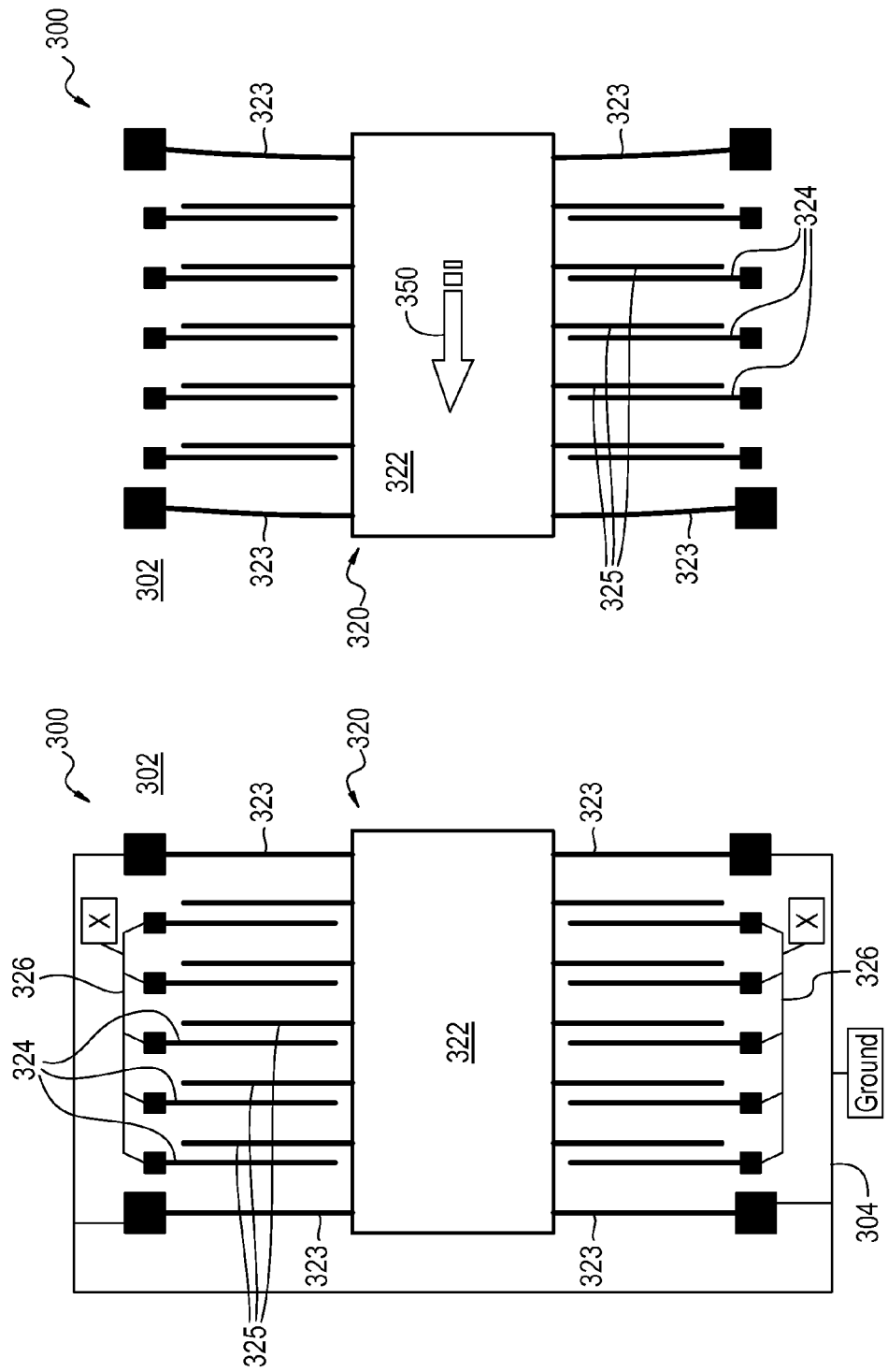
FIG. 3A depicts an example capacitive in-plane translation sensing transducer.
FIG. 3B depicts the capacitive in-plane translation sensing transducer of FIG. 3A, in a deflected state.

FIG. 3A depicts an example capacitive in-plane translation sensing transducer 300 that includes a compliant structure 320. FIG. 3B depicts the capacitive in-plane translation sensing transducer 300 in a deflected state. The compliant structure 320 includes a proof mass 322 attached to a substrate 302 by compliant springs 323, configured to allow greater compliance to inertial forces acting on the proof mass 322 that are oriented in the plane of the substrate 302 (e.g. parallel to the plane of the drawing sheet that includes FIGS. 3A and 3B) than to inertial forces acting on the proof mass 322 that are oriented out of the substrate plane (normal to the drawing sheet that includes FIGS. 3A and 3B).

In the embodiment of FIGS. 3A and 3B, the compliant structure 320 includes a plurality of first surfaces 324 that are electrically isolated from the substrate 302, and a plurality of second surfaces 325 that are electrically connected (e.g. grounded) to the substrate 302 or are a part of the substrate. The first surfaces 324 face respective ones of the second surfaces 325 so that electrical capacitance between the first surfaces 324 and the second surfaces 325 varies inversely with the separation between the first surfaces 324 and the second surfaces 325.

For example, in-plane horizontal acceleration in FIG. 3B may cause a shift 350 of the proof mass 322 to the left (as shown in FIG. 3B). The compliant springs 323 are shown in FIG. 3B to have been deflected and strained, with such strain and deflection accommodating the leftward shift 350 of the proof mass 322 in FIG. 3B. Such leftward shift 350 of the proof mass 322 reduces the separation between the first surfaces 324 and the second surfaces 325 in FIG. 3B, relative to that shown in FIG. 3A. Such reduced separation will increase the electrical capacitance between the first surfaces 324 and the second surfaces 325, so that the change in capacitance can sense the in-plane acceleration of the substrate 302. Alternatively, in-plane horizontal acceleration of the opposite sense would cause a rightward shift of the proof mass 322, increasing the separation between the first surfaces 324 and the second surfaces 325, which would decrease electrical capacitance between the first surfaces 324 and the second surfaces 325.

Such variations in capacitance may be sensed via electrically conductive leads. For example, a pair of first electrically conductive leads 326 may be electrically connected to the first surfaces 324. The capacitance between the first electrically conductive leads 326 and the substrate 302 (e.g. ground 304) varies with translation of the proof mass 322 in the horizontal in-plane direction. In this way, the substrate 302, the second compliant structure 320, and the first electrically conductive lead 326, may together be comprised by a capacitive accelerometer that is more sensitive to accelerations in the substrate plane than to accelerations out of the substrate plane.

Figure 4:
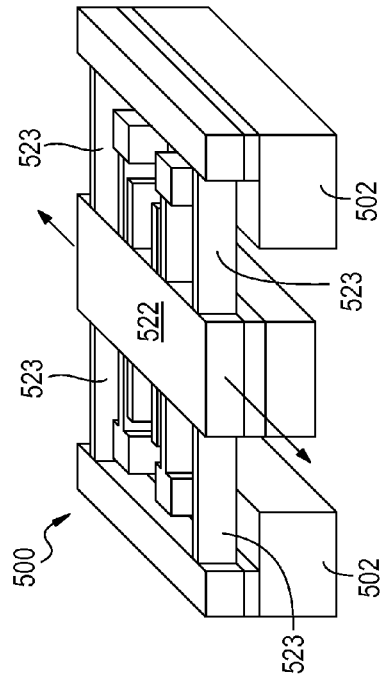
FIG. 4 is a top perspective view of an example capacitive in-plane translation sensing transducer.

FIG. 4 is a top perspective view of an example capacitive in-plane translation sensing transducer 400 that includes a proof mass 422 attached to a substrate 402 by compliant springs 423. The springs 423 are configured to be most compliant to inertial forces acting on the proof mass 422 that are oriented in the plane of the substrate 402 (e.g. along the direction of the arrows shown in FIG. 4).

Figure 5:
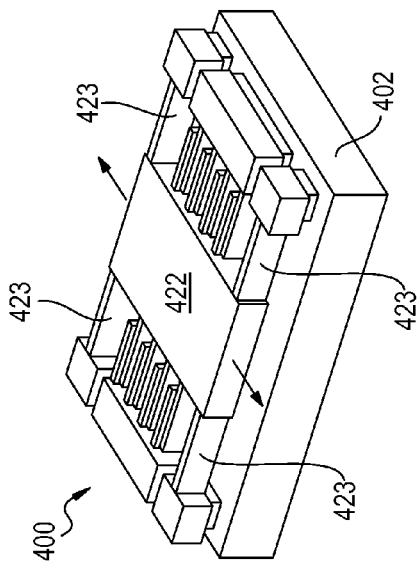
FIG. 5 is a front perspective view of an example capacitive in-plane translation sensing transducer.

FIG. 5 is a front perspective view of an example capacitive in-plane translation sensing transducer 500 that includes a proof mass 522 attached to a substrate 502 by compliant springs 523. The springs 523 are configured to be most compliant to inertial forces acting on the proof mass 522 that are oriented in the plane of the substrate 502 (e.g. along the direction of the arrows shown in FIG. 5).

Figure 6:
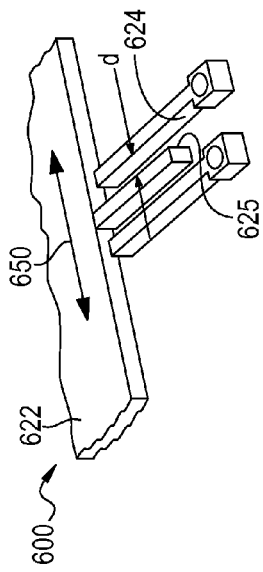
FIG. 6 is a top perspective view of a portion of an example capacitive in-plane translation sensing transducer.

FIG. 6 is a top perspective view of a portion 600 of an example capacitive in-plane translation sensing transducer. The transducer 600 includes a first surface 624 that is fixed with respect to an underlying substrate (not shown in FIG. 6), and a second surface 625 that moves with a proof mass 622 along the direction of the arrows 650. The first surface 624 faces the second surface 625 so that electrical capacitance between the first surface 624 and the second surface 625 varies inversely with the separation d between the first surface 624 and the second surface 625.

FIG. 7A depicts an example capacitive in-plane rotation sensing transducer 700 that includes a compliant structure 720. FIG. 7B depicts the capacitive in-plane rotation sensing transducer 700 in a deflected state. The compliant structure 720 includes a proof mass 722 attached to a substrate 702 by compliant springs 723, configured to be most compliant to inertial torques acting on the proof mass 722 that are oriented in the plane of the substrate 702 (e.g. parallel to the plane of the drawing sheet that includes FIGS. 7A and 7B).

In the embodiment of FIGS. 7A and 7B, the compliant structure 720 includes a plurality of first surfaces 724 that are electrically isolated from the substrate 702, and a plurality of second surfaces 725 that are electrically connected (e.g. grounded) to the substrate 702 or are a part of the substrate 702. The first surfaces 724 face respective ones of the second surfaces 725 so that electrical capacitance between the first surfaces 724 and the second surfaces 725 varies inversely with the separation between the first surfaces 724 and the second surfaces 725.

For example, in-plane rotational acceleration in FIG. 7B may cause a clockwise rotation 750 of the proof mass 722 (as shown in FIG. 7B). The compliant springs 723 are shown in FIG. 7B to have been deflected and strained, with such strain and deflection accommodating the clockwise rotation 750 of the proof mass 722 in FIG. 7B. Such clockwise rotation 750 of the proof mass 722 reduces the separation between the first surfaces 724 and the second surfaces 725 in FIG. 7B, relative to that shown in FIG. 7A. Such reduced separation will increase the electrical capacitance between the first surfaces 724 and the second surfaces 725, so that the change in capacitance can sense the in-plane rotational acceleration of the substrate 702. Alternatively, in-plane rotational acceleration of the opposite sense would cause a counter-clockwise rotation of the proof mass 722, increasing the separation between the first surfaces 724 and the second surfaces 725, which would decrease electrical capacitance between the first surfaces 724 and the second surfaces 725.

FIG. 8A is a top view of an example capacitive in-plane rotation sensing transducer 800. FIG. 8B is a top view of a portion of the capacitive in-plane rotation sensing transducer 800. FIG. 8C is a top perspective view of a portion of the capacitive in-plane rotation sensing transducer 800. The transducer 800 includes a plurality of first surfaces (e.g. 824) that are fixed with and part of a substrate 802, and a plurality of second surfaces (e.g. 825) that move with a proof mass 822 as it rotates in the direction of arrow 850 (in the plane of the drawing sheet that includes FIGS. 8A, 8B, and 8C). The first surfaces 824 face respective ones of the second surfaces 825, so that electrical capacitance between the first surfaces 824 and the second surfaces 825 varies inversely with the separation d between the first surfaces 824 and the second surfaces 825.

For example, in-plane rotational acceleration in FIGS. 8A, 8B, and 8C may cause clockwise rotation 850 of the proof mass 822 (as shown in FIG. 8A), which, in turn reduces the separation d between the first surfaces 824 and the second surfaces 825 (as shown in FIG. 8C). Such reduced separation will increase the electrical capacitance between the first surfaces 824 and the second surfaces 825, so that the change in capacitance can sense the in-plane rotational acceleration of the substrate 802. Alternatively, in-plane rotational acceleration of the opposite sense would cause a counter-clockwise rotation of the proof mass 822, increasing the separation d between the first surfaces 824 and the second surfaces 825, which would decrease electrical capacitance between the first surfaces 824 and the second surfaces 825. In the embodiment of FIGS. 8A, 8B, and 8C, the plurality of second surfaces 825 may be electrically isolated from the substrate 802, while the plurality of first surfaces 824 may be electrically connected to (or part of) the substrate 802.

Figure 9:
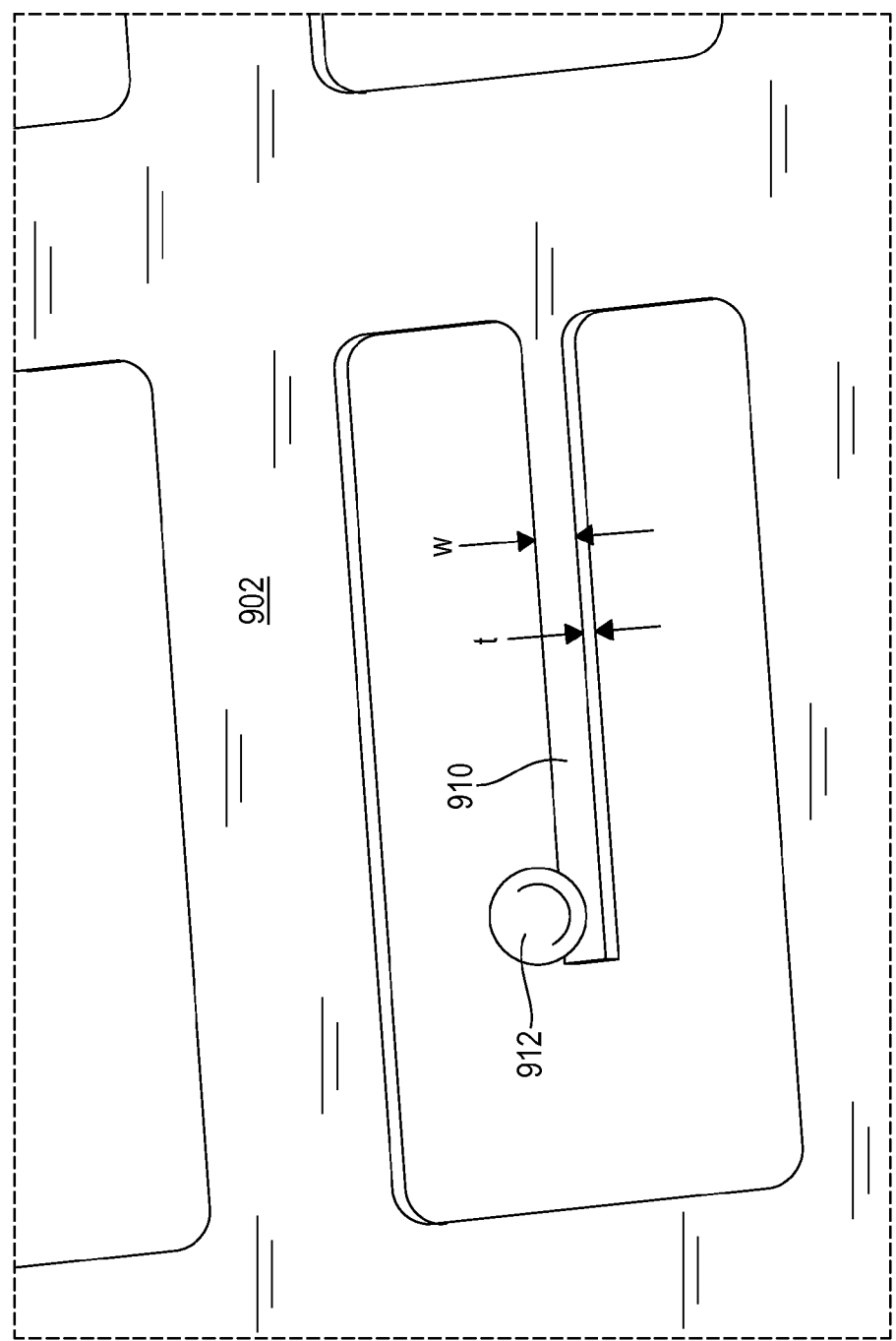
FIG. 9 is a top perspective view of an example out-of-plane translation sensing cantilever structure.

FIG. 9 is a top perspective view of an example out-of-plane translation sensing compliant cantilever structure 910. In certain embodiments, the compliant cantilever structure 910 may have a cantilevered beam thickness t measured perpendicular to a substrate plane 902, that is less than a cantilevered beam width w measured parallel to the substrate plane 902. The compliant cantilever structure 910 may preferably include a proof mass 912 at the distal end of the cantilever beam structure, which may enhance the bending strain of the compliant cantilever structure 910 in response to inertial forces.

Figure 10:
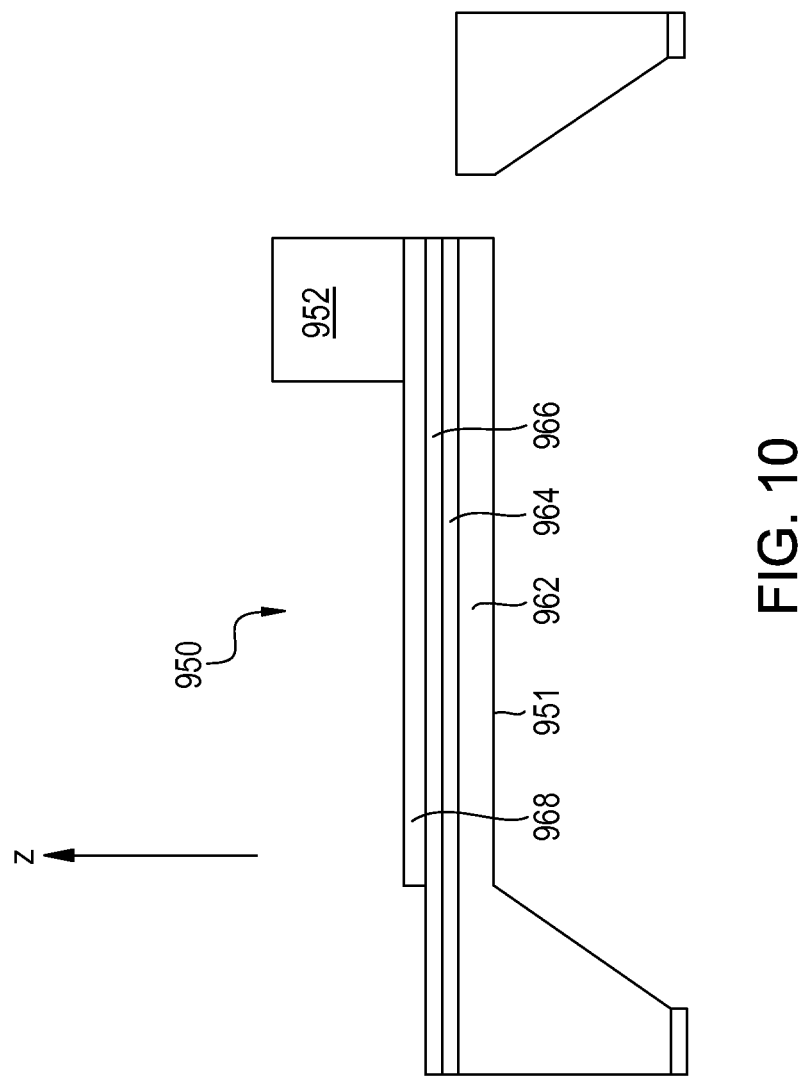
FIG. 10 is a side cross-sectional view of an example out-of-plane piezoelectric translation sensing transducer that incorporates a cantilever structure.

FIG. 10 is a side cross-sectional view of an example out-of-plane piezoelectric translation sensing transducer 950 that incorporates a compliant cantilever structure 951. In the embodiment of FIG. 10, the compliant cantilever structure 951 may be a cantilevered beam fabricated from a laminate structure that includes a layer comprising piezoelectric material (e.g. AlN). For example, the compliant cantilever structure 951 may include a structural layer 962 (e.g. silicon), an optional bottom electrode laminate sub-layer 964 (e.g. aluminum, platinum, copper, gold), a piezoelectric material laminate sub-layer 966 (e.g. AlN), and a top electrode laminate sub-layer 968 (e.g. aluminum, gold).

In the embodiment of FIG. 10, the compliant cantilever structure 951 preferably has a greater compliance to inertial forces oriented out of the substrate plane (e.g. in the Z direction) than to inertial forces oriented in the substrate plane (e.g. normal to the Z direction). In the embodiment of FIG. 10, the compliant cantilever structure 951 preferably includes a proof mass 952 at its distal end, which may enhance the strain of the compliant cantilever structure 951 in response to inertial forces.

Figure 11A:
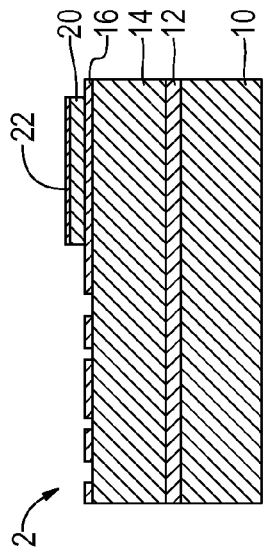
FIG. 11A-F depicts a portion of a wafer cross-section after various hybrid motion sensor fabrication processing steps, according to an embodiment of the present invention.

FIG. 11A-F depicts a portion of a wafer cross-section 2 after various hybrid motion sensor fabrication processing steps, according to an embodiment of the present invention. The first step, depicted in FIG. 11A, is to provide a wafer (e.g. silicon on insulator wafer) with bottom substrate 10, buried oxide layer 12 (e.g. $SiO_2$), upper substrate layer 14, and top oxide layer 16 (e.g. $SiO_2$, $Al_2O_3$). For example, the bottom substrate 10 and the upper substrate layer 14 may each comprise silicon or silicon doped with a dopant that renders the substrate material to be electrically conductive. A cross section 2 of a portion of such a wafer is shown in FIG. 11A.

Figure 11B:
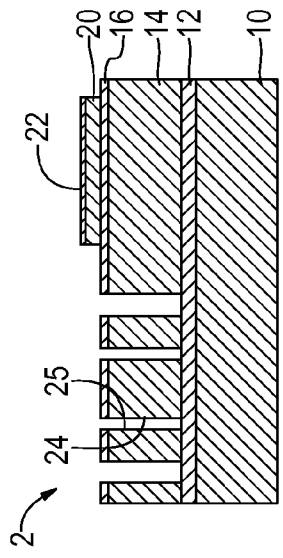
Figure 11C:
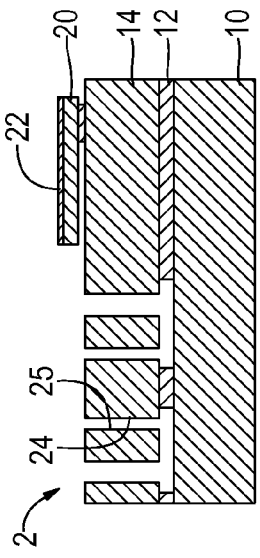

As shown in FIG. 11B, the laminate sub-layers of a piezoelectric transducer may be deposited on top the top oxide layer 16. For example, such deposited laminate sub-layers may include a structural layer 20 (e.g. polysilicon), and a piezoelectric and electrode laminate 22 (e.g. platinum, AlN, platinum). For example the piezoelectric and electrode laminate 22 may comprise the layers of the compliant cantilever structure 951 shown in FIG. 10. In the processing step of FIG. 11C, the laminate sub-layers 20, 22 of the piezoelectric transducer are patterned (e.g. by depositing a photoresist patterned etch stop coating and then etching) to shape the piezoelectric transducer structure and re-expose regions of the top oxide layer 16.

Figure 11D:
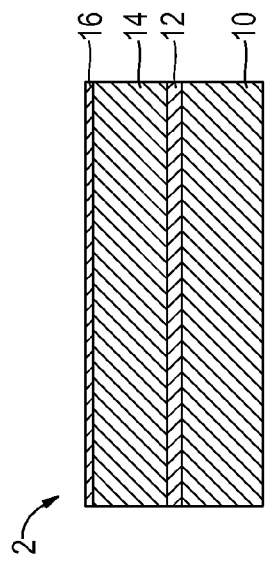
Figure 11E:
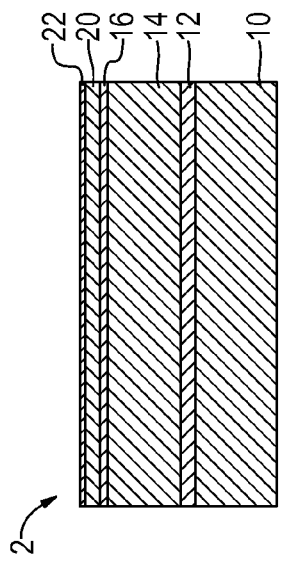

The top oxide layer 16 is patterned in the shape of an in-plane capacitive sensor in the processing step shown in FIG. 11D. Then, as shown in FIG. 11E, the upper substrate layer 14 may be deep reactive ion etched in the regions not protected by the top oxide layer 16. The deep reactive ion etching is preferably continued until it is stopped by the buried oxide layer 12. The deep reactive ion etching of FIG. 11E preferably creates facing surfaces 24, 25 of the in-plane capacitive sensor, so that an electrical capacitance of the in-plane capacitive sensor may later be established between the facing surfaces 24, 25.

Figure 11F:
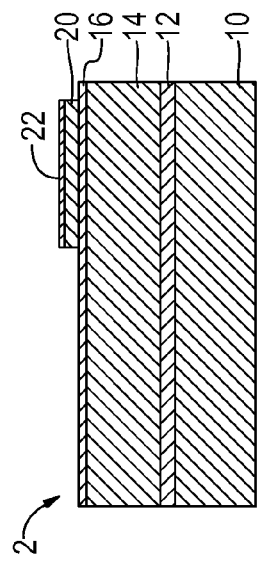

In the processing step shown in FIG. 11F, portions of the top oxide layer 16 and portions of the buried oxide layer 12, are removed, for example by hydrofluoric acid (HF) vapor release etching. Such incomplete oxide layer removal preferably creates compliance in previously-adjoining structures. For example, the incomplete removal of the top oxide layer 16 beneath the structural laminate sublayer 20 may enable the piezoelectric cantilever formed by the structural laminate sublayer 20 and the piezoelectric & electrode laminate sub-layers 22 to be adequately compliant to appreciably deflect in response to out-of-plane accelerations (e.g. vertical accelerations in the view of FIG. 11F). Also for example, the removal of the buried oxide layer 12 beneath the facing surface 25 of the upper substrate layer 14 may free the facing surface 25 to move and thereby alter its spacing relative to the facing surface 24, so that in plane accelerations may change the distance between the facing surfaces 24, 25 and thereby affect the capacitance between the facing surfaces 24, 25.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:
1. A hybrid capacitive and piezoelectric motion sensing transducer comprising:
 a bottom substrate layer;
 an upper substrate layer being electrically conductive and having a major surface that defines a substrate plane;
 a buried oxide layer disposed between the bottom substrate layer and the upper substrate layer;
 a piezoelectric layer;

a top oxide layer disposed between the upper substrate layer and the piezoelectric layer;

a first piezoelectric accelerometer comprising a first compliant structure patterned in the piezoelectric layer and having greater compliance to inertial forces oriented out of the substrate plane than to inertial forces oriented in the substrate plane;

a first capacitive accelerometer comprising a second compliant structure patterned in the upper substrate layer and having greater compliance to inertial forces oriented in the substrate plane than to inertial forces oriented out of the substrate plane, the second compliant structure including a first surface that faces a second surface of the upper substrate layer and that is separated from the second surface by a spacing that varies with an in-plane displacement of the second compliant structure; and a first electrically conductive lead that is electrically connected to the first surface, and a second electrically conductive lead that is electrically connected to the piezoelectric material, wherein a capacitance between the first electrically conductive lead and the second surface varies with the in-plane displacement of the second compliant structure.

2. The hybrid capacitive and piezoelectric motion sensing transducer of claim 1 wherein the upper substrate layer comprises silicon doped with a dopant that increases the electrical conductivity of the silicon.

3. The hybrid capacitive and piezoelectric motion sensing transducer of claim 1 wherein the upper substrate layer comprises silicon and includes an electrically conductive coating on the silicon.

4. The hybrid capacitive and piezoelectric motion sensing transducer of claim 1 wherein the first compliant structure is a cantilevered beam that has a cantilevered beam thickness measured perpendicular to the substrate plane that is less than a cantilevered beam width measured parallel to the substrate plane.

5. The hybrid capacitive and piezoelectric motion sensing transducer of claim 4 wherein the cantilevered beam includes a conductive electrode layer on the piezoelectric layer.

6. The hybrid capacitive and piezoelectric motion sensing transducer of claim 1 wherein the piezoelectric layer comprises AlN.

7. The hybrid capacitive and piezoelectric motion sensing transducer of claim 1 wherein the first capacitive accelerometer further comprises the first electrically conductive lead, and the first capacitive accelerometer is more sensitive to accelerations in the substrate plane, than to accelerations out of the substrate plane.

8. The hybrid capacitive and piezoelectric motion sensing transducer of claim 1 wherein the first piezoelectric accelerometer further comprises the second electrically conductive lead and the first piezoelectric accelerometer is more sensitive to accelerations out of the substrate plane, than to accelerations in the substrate plane.

9. The hybrid capacitive and piezoelectric motion sensing transducer of claim 7 further comprising a second capacitive accelerometer that is more sensitive to accelerations in the substrate plane than to accelerations out of the substrate plane, the second capacitive accelerometer being more sensitive to accelerations parallel to the first surface than to accelerations normal to the first surface, the second capacitive accelerometer including a third compliant structure patterned in the upper substrate layer and that has a third surface that faces a fourth surface of the upper substrate layer and that is separated from the fourth surface by a spacing that varies with an in-plane displacement of the third compliant structure, the second capacitive accelerometer including a third electrically conductive lead that is electrically connected to the third surface.

10. The hybrid capacitive and piezoelectric motion sensing transducer of claim 7 further comprising a second capacitive accelerometer that is more sensitive to rotational accelerations in the substrate plane than to translational accelerations in the substrate plane and translational accelerations out of the substrate plane, the second capacitive accelerometer including a third compliant structure patterned in the upper substrate layer and that has a third surface that faces a fourth surface of the upper substrate layer and that is separated from the fourth surface by a spacing that varies with an in-plane rotation of the third compliant structure, the second capacitive accelerometer including a third electrically conductive lead that is electrically connected to the third surface.

11. A disk drive comprising:

a disk drive base, a spindle rotably attached to the disk drive base;

a disk mounted to the spindle, a head actuator pivotably attached to the disk drive base; and a hybrid capacitive and piezoelectric motion sensing transducer that includes a bottom substrate layer;

an upper substrate layer being electrically conductive and having a major surface that defines a substrate plane;

a buried oxide layer disposed between the bottom substrate layer and the upper substrate layer;

a piezoelectric layer;

a top oxide layer disposed between the upper substrate layer and the piezoelectric layer;

a first piezoelectric accelerometer comprising a first compliant structure patterned in the piezoelectric layer and having greater compliance to inertial forces oriented out of the substrate plane than to inertial forces oriented in the substrate plane;

a first capacitive accelerometer comprising a second compliant structure patterned in the upper substrate layer and having greater compliance to inertial forces oriented in the substrate plane than to inertial forces oriented out of the substrate plane, the second compliant structure including a first surface that faces a second surface of the upper substrate layer and that is separated from the second surface by a spacing that varies with an in-plane displacement of the second compliant structure; and a first electrically conductive lead that is electrically connected to the first surface, and a second electrically conductive lead that is electrically connected to the piezoelectric material, wherein a capacitance between the first electrically conductive lead and the second surface varies with the in-plane displacement of the second compliant structure.

12. The disk drive of claim 11 wherein the first compliant structure is a cantilevered beam that has a cantilevered beam thickness measured perpendicular to the substrate plane that is less than a cantilevered beam width measured parallel to the substrate plane.

13. The disk drive of claim 12 wherein the cantilevered beam includes a conductive electrode layer on the piezoelectric layer.

14. The disk drive of claim 11 wherein the first capacitive accelerometer further comprises the first electrically conductive lead, and the first capacitive accelerometer is more sensitive to accelerations in the substrate plane, than to accelerations out of the substrate plane.

15. The disk drive of claim 11 wherein the first piezoelectric accelerometer further comprises the second electrically conductive lead, and the first piezoelectric accelerometer is more sensitive to accelerations out of the substrate plane, than to accelerations in the substrate plane.

16. The disk drive of claim 14 wherein the hybrid capacitive and piezoelectric motion sensing transducer further comprises a second capacitive accelerometer that is more sensitive to rotational accelerations in the substrate plane than to translational accelerations in the substrate plane and translational accelerations out of the substrate plane, the second capacitive accelerometer including a third compliant structure patterned in the upper substrate layer and that has a third surface that faces a fourth surface of the upper substrate layer and that is separated from the fourth surface by a spacing that varies with an in-plane rotation of the third compliant structure, the second capacitive accelerometer including a third electrically conductive lead that is electrically connected to the third surface.

* * * * *